Aug. 25, 1964    M. E. FUENTEVILLA    3,146,077
FREEZE DRYING APPARATUS
Filed July 20, 1961

INVENTOR.
MANUEL E. FUENTEVILLA
BY Arthur H. Seidel
ATTORNEY

3,146,077
FREEZE DRYING APPARATUS
Manuel E. Fuentevilla, Haddonfield, N.J., assignor, by mesne assignments, to Pennsalt Chemicals Corporation, Philadelphia, Pa., a corporation of Pennsylvania
Filed July 20, 1961, Ser. No. 125,454
6 Claims. (Cl. 34—76)

This invention relates to a freeze drying apparatus, and more particularly, to a freeze drying apparatus having novel means providing for thermal expansion of shelves on which articles to be freeze dried are supported, and novel means for reducing the pressure to which the articles are subjected, and novel means for removing moisture which is evolved during the freeze drying process.

In a freeze drying process, articles to be freeze dried are frozen and then placed within a hermetically sealed enclosure. Means are provided to heat the articles to be freeze dried while they are subjected to a reduced pressure thereby causing ice within the frozen articles to sublime. The moisture evolved by sublimation of the ice is withdrawn and passed through a condenser means.

The condenser means of the present invention includes a pair of condensers alternately connected to the enclosure. In this manner, the efficiency of the freeze drying apparatus is increased since one of the condensers will be in communication with the enclosure while the other condenser is connected to a means for melting the ice accumulated on the condenser coils. In addition, a novel means is provided to reduce the de-icing time for a condenser by generating latent heat which pre-cools the condenser prior to the flow of a coolant medium such as brine through the coils of the condenser.

It is an object of the present invention to provide a novel freeze drying apparatus which is more efficient than the freeze drying apparatus proposed heretofore.

It is another object of the present invention to provide a freeze drying apparatus with a pair of condensers which are alternately connected to the article receiving chamber.

It is another object of the present invention to provide a freeze drying apparatus with shelves supported in a manner so as to accommodate thermal expansion.

It is still another object of the present invention to provide a novel freeze drying apparatus having a pair of condensers alternately connected to the article receiving chamber with a de-icing means for the condensers being capable of pre-cooling the condenser coils.

Other objects will appear hereinafter.

For the purpose of illustrating the invention there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a freeze drying apparatus of the present invention designated generally as 10.

Figure 1:
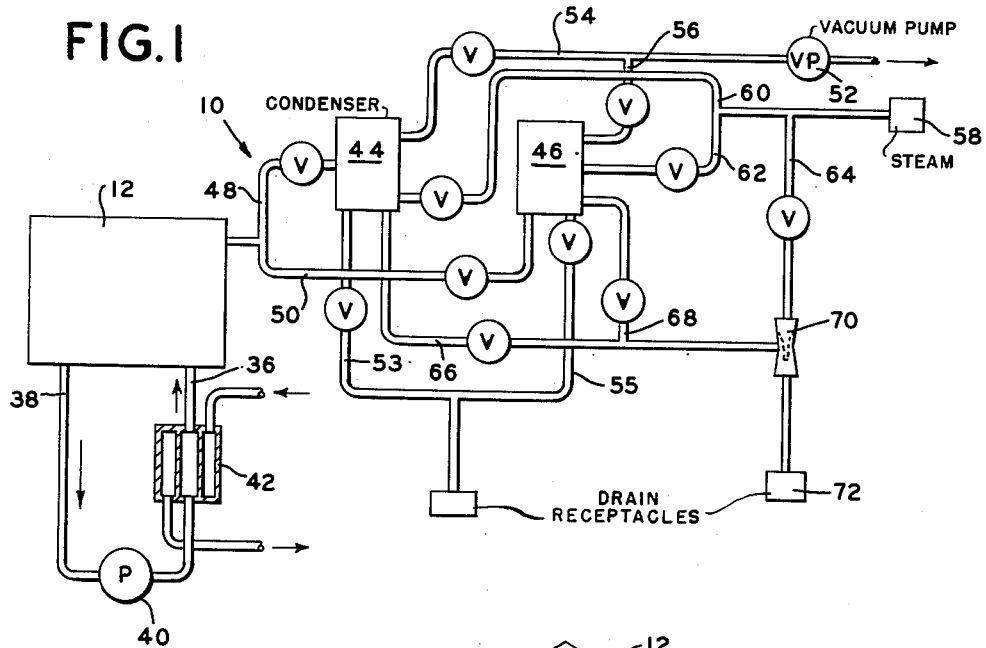
FIGURE 1 is a schematic illustration of the freeze drying apparatus of the present invention.
Figure 2:
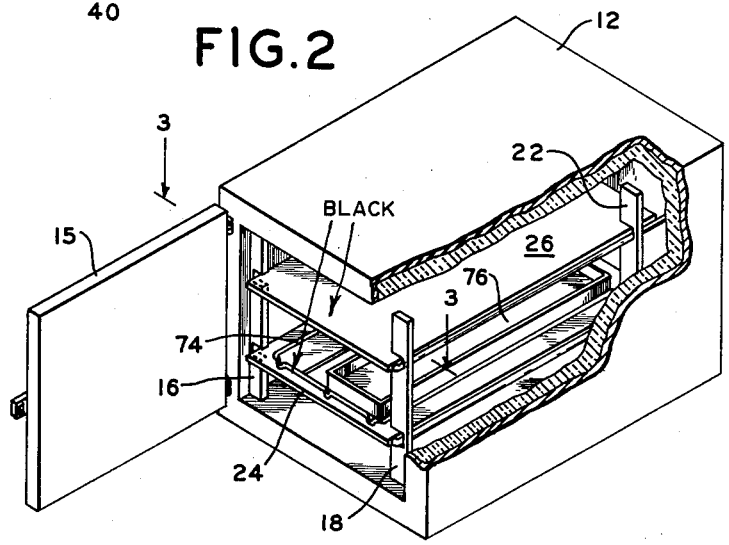
FIGURE 2 is a perspective view of the housing in which the articles to be freeze dried are supported during the freeze drying cycle.
Figure 3:
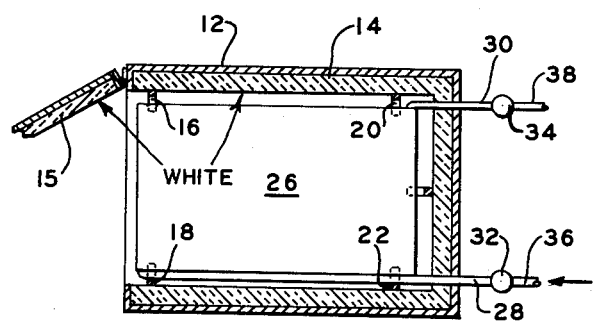
FIGURE 3 is a transverse sectional view taken along the lines 3—3 in FIGURE 2.

The freeze drying apparatus 10 includes a housing 12 which is generally rectangular in shape. The housing 12 is provided with insulation 14 and a selectively operable door 15 connected to the housing 12 by a pair of hinges. The door 15 provides access to the interior of the housing 12.

A plurality of standards 16–22 are disposed upright within the housing 12 along the side walls thereof. Preferably, the standards 16–22 are disposed in pairs at spaced points therealong. The standards 16–22 are provided with a plurality of spaced notches. A hollow shelf is supported by the standards 16–22 by the notches on such standards. Thus, shelves 24 and 26 are each supported in separate notches at spaced points along the length of the standards 16–22.

The shelves 24 and 26 are identical. Thus, only shelf 26 need be described in detail. While only two such shelves are shown, it will be appreciated that a greater number of shelves are generally provided in commercial apparatus. The shelf 26 is hollow so that a heat exchange medium may be circulated therethrough. Thus, the shelf 26 is provided with an inlet conduit 28 and an outlet conduit 30.

A manifold 32 is provided. The manifold 32 is in communication with the inlet conduit for each of the shelves.

The outlet conduit 30 for the shelf 26 is connected to a manifold 34. The manifold 34 is connected to the outlet conduit for each shelf. A conduit 36 is in communication with the manifold 32 and extends therefrom to the outlet side of a pump 40. A conduit 38 extends from the manifold 34 to the inlet side of the pump 40. A heat exchanger 42 is provided in the conduit 36.

A pair of condensers 44 and 46 are provided for the housing 12. The condenser 44 is in communication with the housing 12 by way of a valve conduit 48. The condenser 46 is in communication with the housing 12 by way of a valve conduit 50. It will be understood that the condensers 44 and 46 are provided with coils in communication with a source of coolant such as brine, ammonia, etc.

A vacuum pump 52 is in communication with the condenser 44 by way of valve conduit 54. The vacuum pump 52 is in communication with the condenser 46 by way of valve conduit 56. The condensers 44 and 46 are provided with valved drain conduits 53 and 55 respectively. The conduits 53 and 55 are in communication with any convenient receptacle.

A source of steam 58 having a pumping means (not shown) is provided. It will be appreciated that other means such as hot water may be utilized in place of steam. The outlet side of the source of steam 58 branches into valve conduit 60, 62 and 64. The conduit 60 is in communication with the condenser 44 and the conduit 62 is in communication with the condenser 46.

The condenser 44 is provided with a valve conduit 66 and the condenser 46 is provided with a valve conduit 68. The conduits 66 and 68 are in communication with the throat of ejector 70. The inlet side of the ejector 70 is connected to the valve conduit 64 and the outlet side of the ejector 70 is connected to any suitable receptacle 72.

The remaining elements of the present invention will be described hereinafter in conjunction with the description of the operation of the apparatus 10.

A heat exchange medium is circulated through the shelves so as to raise the temperature thereof. The vacuum pump 52 is activated and is in communication with the interior of the housing 12 by way of conduit 48, condenser 44, and conduit 54. An automatic switching apparatus (not shown) is provided to open the valves in conduits 48 and 54 while the valves in all other conduits are closed.

Pans 76 having articles to be freeze dried, with said articles being in a frozen state, are supported in spaced relationship to the shelves by means of wire trays 74. After the pans 76 have been disposed on the trays 74, the door 15 is closed so that the housing 12 is hermetically sealed. The combination of the radiant heat from the shelves and the reduced pressure in the housing 12 causes the ice in the frozen articles to sublime.

The moisture from the sublimation of the ice within the frozen articles is condensed by the condenser 44 on the cooling coils therein. Accordingly, the outlet side of the vacuum pump 52 may be in communication with atmosphere. After a predetermined period of time, the coils in the condenser 44 accumulate ice so that the condenser 44 becomes inefficient.

After a predetermined period of time, slightly less than the length of time necessary to accumulate a substantial amount of ice on the coils in the condenser 44, the valves in conduits 48 and 54 are closed and the valves in conduits 50 and 56 are opened. Thus, the chamber within the housing 12 is now in communication with the vacuum pump 52 through the condenser 46.

While the housing 12 is in communication with the condenser 46, the valves in conduits 60 and 53 are opened. Thus, steam will be circulated through the condenser 44 so as to melt the ice on the condenser coils with the resultant liquid draining out through the conduit 53. Prior to the complete melting of the ice on the coils in the condenser 44, the valves in conduits 60 and 53 will be closed and the valves in conduits 64 and 66 will be opened. Thus, steam will be directed through the ejector 70 thereby reducing the pressure within the condenser 44. The reduction of pressure in the condenser 44 by the steam ejector 70 causes the latent heat of the remaining ice and moisture in the condenser 44 to cool the condenser coils therein. Thus, the coils in the condenser 44 will be pre-cooled by the removal of moisture therefrom prior to placing the condenser 44 in communication with the housing 12.

Thereafter, the valves in conduits 64 and 66 will be closed and the condenser 44 may be placed in communication with the housing 12 prior to the time at which a substantial amount of ice has accumulated on the coils in the condenser 46. When it is desired to reuse the condenser 44, the valves in conduits 48 and 54 are opened and the valves in conduits 50 and 56 are closed. Thereafter, the ice on the coils in the condenser 46 is removed as set forth above.

During the freeze drying process, the shelves 24 and 26 have been heated by the medium flowing therethrough. The cutout notches on the standards 16-22 enable the shelves to expand radially outwardly toward the side walls of the housing 12 and toward the door 15. Difficulties have occurred heretofore in regard to the proper amount of heat to be supplied to the articles being freeze dried. A limitation which effects the heat to be conveyed to the articles is the length of time for the freeze drying process. Often, the freeze drying process lasts for a period of twenty-four hours. During this period, the heat supplied to the articles must be constant and below the amount of heat required to melt the ice within the articles being freeze dried.

In order to properly freeze dry an article, the ice therein must be sublimed. If the ice in the articles is permitted to melt, the properties of the freeze dried article are effected. Care must be taken so that the articles being freeze dried do not become overheated. In accordance with the present invention, the articles being freeze dried are heated by radiant heat. It has been found that heating by conduction is not uniform thereby effecting the properties of the articles or causing a limited amount of melting of the ice in the articles.

I have found that the difficulties encountered heretofore in regard to the heat supply may be overcome by using black shelves, black trays and black pans. By black is meant the thermodynamic effect of a black body which thermodynamically is an absorptive surface of high emissivity. In addition, the interface of the door 15 is preferably white. By using a heat supply in this manner, I have found that the heating is uniform and the length of time of the heating may be reduced.

Tests which I have run in regard to the drying time show that one sample required thirteen and one-half hours for the material being dried to reach a temperature of 14° C. When the sample was placed in a housing 12 having black shelves, black trays and black pans with the door coated white, it took only seven hours for the dried articles to reach a temperature of 14° C. Thus, the drying time is reduced almost fifty percent.

In order to utilize shelves, trays and pans which are black, at the temperature and time requirements of freeze drying processes, I have found that the shelves, trays and pans may attain their black color by being coated with urethane, baked phenol-formaldeyde resin, etc.

While the inlet conduit 28 for the shelf 26 is disposed along the entire length thereof and supported by the standards 18 and 22, it will be understood that the conduit 28 may be connected to the shelf 26 in the same manner as conduit 30. That is, the conduit 28 may merely extend through the rear wall of the housing 12 and connect to the interior of the shelf 26. However, the preferred embodiment is as illustrated since the same eliminates pockets in the shelf which produce non-uniform radiation.

The present invention may be embodied in other specific forms without departing from the spirit or essential attributes thereof and, accordingly, reference should be made to the appended claims, rather than to the foregoing specification as indicating the scope of the invention.

I claim:

1. A freeze drying apparatus comprising a housing, shelves within said housing, means for heating said shelves, means for mounting the shelves so as to accommodate thermal expansion of said shelves, said shelves having a black coating thereon, means including a condenser for removing moisture from within said housing and reducing the pressure therein, said last mentioned means including a pair of condensers, means for evacuating the interior of said housing alternatively through one of said condensers, valved conduit means for selectively circulating steam through said condensers, said valved conduit means connecting said condensers to the throat of an ejector, whereby a fluid may be circulated through said ejector so as to remove moisture from the condensers with the latent heat of evaporation pre-cooling said condensers.

2. Apparatus in accordance with claim 1 wherein the interior of said housing is coated white.

3. A freeze drying apparatus comprising a housing, spaced shelves horizontally disposed within said housing, vacuum producing means connected to said housing, means coupled to said shelves for heating said shelves, means providing a horizontal support surface below each shelf for supporting the shelves in a manner so as to accommodate thermal expansion of said shelves, said shelves having a black coating thereon, pans coated black for supporting articles to be freeze dried, and spacer means disposed between said pans and said shelves whereby products to be freeze dried will be heated by radiant heat from said shelves, and condenser means for removing moisture from within said housing and reducing the pressure therein.

4. The freeze drying apparatus of claim 3 including valve conduit means for selectively circulating steam through said condenser, means for removing moisture accumulated by condensation of steam and melting of ice within said condenser, means for utilizing the latent heat of evaporation of ice in said condenser for pre-cooling said condenser, said last-mentioned means including a valve conduit means connecting said condenser to the throat of an ejector, whereby a fluid may be circulated through said ejector so as to remove moisture from the condenser with the latent heat of evaporation pre-cooling said condenser.

5. Apparatus in accordance with claim 1 including pans coated black for supporting articles to be freeze dried in said housing, and a black colored tray disposed between said pans and one of said shelves whereby the articles to be freeze dried in said pans will be heated by radiant heat from said shelves.

6. Apparatus in accordance with claim 3 wherein the means for heating the shelves includes inlet and outlet conduits in communication with a hollow interior of the shelves, the inlet conduit for each shelf being in communication with the shelves at an end opposite to the end of the shelves in communication with the outlet conduit thereof.

References Cited in the file of this patent

UNITED STATES PATENTS

| | | |
|---|---|---|
| 1,215,951 | Martini | Feb. 13, 1917 |
| 2,018,252 | Cruikshank | Oct. 22, 1935 |
| 2,345,548 | Flosdorf | Mar. 28, 1944 |
| 2,389,452 | Patterson | Nov. 20, 1945 |
| 2,425,714 | Baer | Aug. 19, 1947 |
| 2,436,693 | Hickman | Feb. 24, 1948 |
| 2,471,677 | Flosdorf | May 31, 1949 |
| 2,731,734 | Bancroft | Jan. 24, 1956 |